(12) United States Patent
Becker et al.

(10) Patent No.: US 9,873,069 B2
(45) Date of Patent: Jan. 23, 2018

(54) WASTEWATER LIFTING STATION

(71) Applicant: KSB Aktiengesellschaft, Frankenthal (DE)

(72) Inventors: Michael Becker, Frankenthal (DE); Enrico Mueller, Frankenthal (DE)

(73) Assignee: KSB Aktiengesellschaft, Frankenthal (DE)

(*) Notice: Subject to any disclaimer, the term of this patent is extended or adjusted under 35 U.S.C. 154(b) by 2 days.

(21) Appl. No.: 14/904,165

(22) PCT Filed: Jul. 8, 2014

(86) PCT No.: PCT/EP2014/064583
§ 371 (c)(1),
(2) Date: Jan. 11, 2016

(87) PCT Pub. No.: WO2015/004123
PCT Pub. Date: Jan. 15, 2015

(65) Prior Publication Data
US 2016/0158673 A1    Jun. 9, 2016

(30) Foreign Application Priority Data
Jul. 12, 2013 (DE) .................. 10 2013 213 709

(51) Int. Cl.
*E03F 5/22* (2006.01)
*B01D 29/03* (2006.01)
(Continued)

(52) U.S. Cl.
CPC ............. *B01D 29/03* (2013.01); *E03F 5/101* (2013.01); *E03F 5/14* (2013.01); *E03F 5/22* (2013.01)

(58) Field of Classification Search
CPC ..... E03F 5/10; E03F 5/101; E03F 5/14; E03F 5/22
(Continued)

(56) References Cited

U.S. PATENT DOCUMENTS 1,397,471 A * 11/1921 Walker ...................... E03F 7/06
                                                          210/131
4,488,835 A * 12/1984 Eicher ..................... E02B 1/006
                                                          210/162
(Continued)

FOREIGN PATENT DOCUMENTS

DE        1 253 188      10/1967
DE        1609136    *   4/1970
(Continued)

OTHER PUBLICATIONS

International Preliminary Report on Patentability (PCT/IB/373) issued in PCT Application No. PCT/EP2014/064583 dated Jan. 12, 2016, including English translation of Written Opinion (PCT/ISA/237) (nine (9) pages).
(Continued)

*Primary Examiner* — Christopher Upton
(74) *Attorney, Agent, or Firm* — Crowell & Moring LLP

(57) ABSTRACT

A wastewater lifting station is provided, in which at least one solids collection tank contains at least one screen for guiding wastewater therethrough and retain solids. The screen divides the solids collection tank into a region containing solids and a region free of solids, and is connected in a pivotable manner by at least one hinge to a flange of the solids collection tank. The screen in an edge region away from the hinge has a rake of comb-type webs and holes that are open on one side in the screen plane. The wastewater containing solids flows through a feed into the collection tank, is filtered through the screen, and the wastewater that is free of solids is collected in a tank downstream. When the
(Continued)

wastewater lifting station pumps, the wastewater that is free of solids is pumped by a pump in counterflow through the screen into a pressurized line while the feed is shut off by a check valve, and the screen pivots about the hinge and is back-flushed during the process. Reliable cleaning of the screen, even of fibers, is achieved during pumping owing the rake shape and the pivoting of the screen.

13 Claims, 3 Drawing Sheets

(51) Int. Cl.
*E03F 5/10* (2006.01)
*E03F 5/14* (2006.01)

(58) Field of Classification Search
USPC ..... 210/131, 156, 159, 162, 170.03, 170.08; 405/52
See application file for complete search history.

(56) References Cited

U.S. PATENT DOCUMENTS 5,160,216 A * 11/1992 Takada ............ E02B 3/00 405/52
5,543,038 A * 8/1996 Johannessen ........... E03F 5/101 210/162
6,132,626 A * 10/2000 Hart ................. E03F 5/101 210/162
6,478,954 B1 * 11/2002 Turner, Jr. ............ E03F 5/12 210/162
2007/0034577 A1 * 2/2007 Bayard ................ E03F 5/06 210/163

FOREIGN PATENT DOCUMENTS

| DE | 1 609 166 | | 7/1970 |
| DE | 1966792 | * | 5/1974 |
| DE | 25 58 654 A1 | | 7/1977 |
| EP | 1997971 | * | 12/2008 |
| EP | 2 581 508 A1 | | 4/2013 |
| WO | WO 2010/025852 A1 | | 3/2010 |

OTHER PUBLICATIONS

International Search Report (PCT/ISA/210) issued in PCT Application No. PCT/EP2014/064583 dated Aug. 18, 2014, with English translation (six (6) pages).

German Office Action issued in counterpart German Application No. 10 2013 213 709.5 dated Apr. 16, 2014, (six (6) pages).

* cited by examiner

WASTEWATER LIFTING STATION

This application is a National Phase of PCT International Application No. PCT/EP2014/064583, filed Jul. 8, 2014, which claims priority under 35 U.S.C. § 119 from German Patent Application No. 10 2013 213 709.5, filed Jul. 12, 2013, the entire disclosures of which are herein expressly incorporated by reference.

BACKGROUND AND SUMMARY OF THE INVENTION

The invention relates to a wastewater lifting station having at least one bulky-material collection container having at least one separating screen which is arranged in the interior thereof for wastewater which is to be guided therethrough and is loaded with bulky materials, wherein the separating screen subdivides the bulky-material collection container into a bulky-material loaded region and a bulky-material free region, and wherein the separating screen is connected so as to be pivotable via a hinge to a flange of the bulky-material collection container.

This means that the separating screen is pivotably mounted in the interior of the bulky-material collection container. To this end, the separating screen is connected to the flange via the hinge. In this context the hinge in principle may also be configured as an integral hinge or as a hinge which is made available by a flexible strip, respectively. The flange generally defines a fastening region for the hinge on the bulky-material collection container or in the interior thereof.

In a wastewater lifting station of the construction described at the outset according to German patent document no. DE 1 609 166, the procedure is such that the separating screen is configured as a rake having a non-return flap. The rake is covered by the non-return flap. The rake teeth of the rake here do not fully fill the entire cross section of a connection line. As a consequence of the cross section which is kept open with the aid of the rake, the rake is no longer intended to be able to be obstructed by the bulky materials. On account thereof, operational disruptions are to be avoided.

In the further prior art as per International patent document no. WO 2010/025852 A1, a wastewater lifting station in which a connection line having a combined shut-off/screening installation is connected to the bulky-material collection container is described. The shut-off/screening installation is disposed in the interior of the bulky-material collection container. Moreover, the separating screen and the shut-off/screening installation in question are aligned so as to be substantially mutually perpendicular. On account thereof, even large quantities of wastewater having solids located therein may be managed.

The state of the art in principle has been successful in cases where wastewater lifting stations lift to a specific level wastewater which has generally been collected at the end side of a wastewater storage space. Even large quantities of wastewater may be managed here. On account thereof, there is the overall potential for wastewater to be able to be further treated in a remote wastewater treatment plant which is at a higher elevation, for example. By way of the at least one bulky-material collection container a pump which is downstream of the bulky-material collection container will be protected from the solids located in the wastewater. On account thereof, pumps of a comparatively small constructive size with low drive power may be employed for the described object of lifting wastewater.

This is to say that the solids are initially separated from the wastewater or from a conveying medium, respectively, prior to this conveying medium entering the pump. This is substantially ensured by the bulky-material collection container having the separating screen disposed in the interior thereof. It is only the wastewater which is free of bulky-material and is consequently pre-cleaned which in this context is transferred into a fluid collection container which is downstream of the bulky-material collection container. The pre-cleaned wastewater may now be readily processed with the aid of said pump and, in particular, be lifted to the desired level. During this procedure at the same time the solids which before have been retained by the separating screen are released therefrom again.

However, the problem increasingly arises in practice of the solids which have been trapped by the separating screen not, or not completely, being released from the separating screen during flushing out of the separating screen in the course of the wastewater lifting procedure. The root cause thereof is that there is a growing proportion of short and long fibrous material in wastewater today. Moreover, a growing proportion of fats and granules are observed, so that the latter in conjunction with the fibers often clog the separating screens employed. Altogether, this may lead to undesirable stoppage times. The invention proceeds from here.

The invention is based on the technical object of refining a wastewater lifting station of this type such that cleaning of the separating screen by back-flushing, in particular using pre-cleaned wastewater, is performed in a manner which is flawless and as complete as possible.

In order for this object to be achieved the invention, in the case of a wastewater lifting station of the generic type, includes a separating screen at least in the hinge-remote peripheral region has at least one cut-out which is open toward the outside, that is to say toward the peripheral region. It has proven successful, for example, for the hinge-remote peripheral region of the separating screen to be configured in the manner of a comb.

The invention at this point firstly proceeds therefrom that the separating screen subdividing the bulky-material collection container is connected so as to be pivotable to the flange via the hinge in the interior of the bulky-material collection container. In conjunction with the flange, the separating screen which is connected via the hinge to the flange consequently ensures that the bulky-material collection container is subdivided in the described manner into the bulky-material loaded region and the bulky-material free region.

In order for the solids which adhere thereto and, in particular, the fibers or other expansive solids to be flawlessly removed from the separating screen in the course of back-flushing or flushing out of the separating screen, the invention provides that the separating screen at least in the hinge-remote peripheral region has at least one cut-out which is open toward the outside, for example is configured in a comb-type manner in the hinge-remote peripheral region in question. The invention here proceeds from the concept that the hinge-remote peripheral region in question primarily ensures the closure and the subdivision, respectively, of the bulky-material collection container by the separating screen.

The hinge-remote peripheral region most often bears on a sealing region of the bulky-material collection container, in the simplest case on the inner wall thereof. On account of this sealing region now being equipped with the cut-out which is open toward the outside, any fibrous or elongate solids which may potentially adhere to the separating screen will be stripped away, so to speak, from the hinge-remote peripheral region of the separating screen by the stream during back-flushing of the separating screen. As a consequence of the cut-out which is open toward the outside, the fibers may no longer be retained by the separating screen. The separating screen which most often bears on the sealing region of the bulky-material collection container in an oblique manner during the flushing procedure is raised from said sealing region, so that the flushing stream utilizes the slot between the raised separating screen and the sealing region of the bulky-material collection container as a passage. Since the cut-out which is open toward the outside is disposed on the separating screen in the region of the passage, even fibrous solids are readily released from the separating screen during this procedure. As a matter of fact, the cut-out or the pluralities of cut-outs, respectively, is/are indeed opened in the direction of flow of the flushing stream.

It is understood in principle that not only one separating screen but a plurality of successively disposed separating screens, for example, having corresponding cut-outs may be implemented. The separating screens which consequently are successively disposed in the direction of flow here may be designed such that the cut-outs are disposed in a mutually offset manner. However, most often only one separating screen will be operated in order for the costs to be minimized and for contamination to be avoided. This is where the substantial advantages are to be seen.

It has proven successful for the separating screen in the hinge-remote peripheral region to be equipped with a plurality of longitudinal slots between comb-type webs. The hinge-remote peripheral region here typically defines the peripheral region of the separating screen which is opposite the hinge for the pivotable connection of the separating screen to the flange. Since the hinge is most often connected to the flange in the interior of the bulky-material collection container at the top side of the separating screen, the hinge-remote peripheral region of the separating screen corresponds to the base region thereof which, in the course of the intake of wastewater loaded with bulky material, bears on the sealing region of the bulky-material collection container or on the inner wall thereof, respectively.

The individual longitudinal slots between the comb-type webs in the hinge-remote peripheral region of the separating screen as per an advantageous design embodiment are all configured so as to be open toward the outside. On account thereof, solids of a specific size are retained, on the one hand, namely such which in terms of their diameter cannot pass through the longitudinal slots. At the same time, the opening of the longitudinal slots toward the outside in the hinge-remote peripheral region ensures, on the other hand, that any potential fibers or elongate bulky materials during flushing of the separating screen are stripped away, by the stream flowing in the same direction, from the separating screen which then is at least slightly opened and raised from the sealing region on the bulky-material collection container.

The comb-type webs are generally disposed so as to be mutually equidistant, that is to say equally spaced apart. The reason therefor is to provide in each case identical screening conditions for the bulky materials to be retained. Moreover, it has proven successful for the longitudinal slots and the webs to run so as to be approximately mutually parallel. In principle it is also possible for the longitudinal slots and the webs to be mutually aligned radially. It is ensured overall in this way that solids of a specific size are flawlessly retained by the separating screen.

The bulky-material collection container is most often hollow-cylindrical. Since the separating screen, specifically in conjunction with the flange, subdivides the hollow-cylindrical bulky-material collection container into the bulky-material loaded region and the bulky-material free region, it is recommended that the separating screen is configured in the manner of a circular-disk segment up to being an elliptical segment. This applies to the flange in a comparable way. This means that the circular-disk segment type flange and the separating screen, which is likewise circular-disk segment type to elliptical segment type, when viewed from the front collectively and typically define a circular disk which is adapted to or may be adapted to the diameter and the layout of the hollow-cylindrical bulky-material collection container.

Besides the separating screen, a shut-off installation is usually connected to the flange. This shut-off installation in conjunction with the separating screen may assume a screening function. Then the shut-off installation is a combined shut-off/screening installation, such as is described in detail in International patent document no. WO 2010/025852 A1. However, this is not mandatory.

It has proven successful for the separating screen to be connected via the hinge to the flange at an inclination angle in relation to the sealing region or to the inner wall of the bulky-material collection container, respectively. This is to say that the separating screen in the installed and non-pressurized state (installed state) while considering the inclination angle in question bears on the sealing region in the interior of the bulky-material collection container. Conversely, the separating screen during the back-flushing procedure and any pressurizing associated therewith is raised from the sealing region. The inclination angle is reduced thereby.

A bypass is most often additionally provided. For reasons of particularly compact and cost-effective manufacturing it has proven successful in this context for the bypass to be provided in the bulky-material free region of the bulky-material collection container. To this end a flow baffle plate of corresponding design may be operated as a bypass. It goes without saying that this is not mandatory, since operation is just as readily possible using a bypass which is disposed outside the bulky-material collection container, or entirely without a bypass.

Finally, it has proven successful for the flange supporting the separating screen, the separating screen, optionally the shut-off installation, and the optional bypass to form a functional unit which is insertable into the bulky-material collection container. In principle, the flange may also be a terminal flange of the respective bulky-material collection container, or be connected to one of the latter, so that the functional unit in principle needs only to be completed using a further terminal flange (to the bulky-material collection container). On account thereof, any potential maintenance work may be carried out in a particularly simple manner, and the separating screen may be readily replaced if and when required.

As a result, a wastewater lifting station which even captures long and fibrous or generally elongate bulky materials and is not prone to clogging is provided. During flushing out of the wastewater lifting station according to the invention the separating screen is initially raised from its bearing on the sealing region in the interior of the bulky-material collection container, on the one hand. On account thereof, a defined passage between the hinge-remote peripheral region of the separating screen and the sealing region in question on the sleeve or on the inner wall of the bulky-material collection container for the pre-cleaned wastewater streaming therethrough is established, on the other hand. Additionally, the separating screen according to the invention in the hinge-remote peripheral region is equipped with at least one cut-out which is open toward the outside, so that the described flushing procedures ensure that any potential fibers or generally elongate solids are stripped away from the separating screen by the stream. On account thereof and as opposed to the prior art, in particular long and fibrous bulky materials cannot or can no longer clog the separating screen according to the invention, and long service life without repairs or maintenance works is to be expected. The substantial advantages are to be seen herein.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
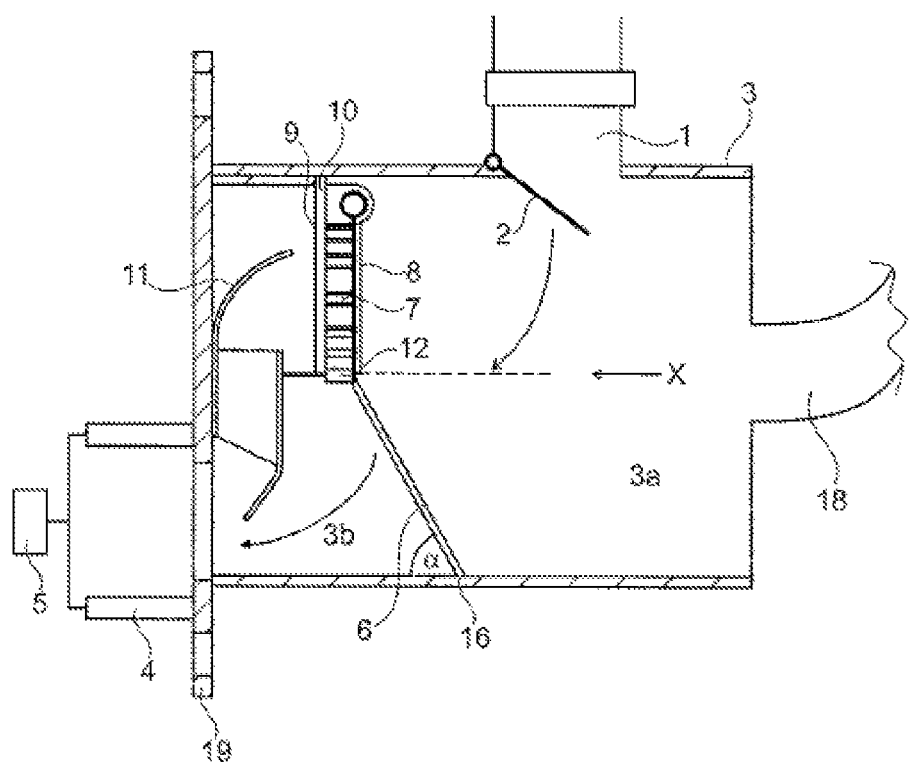
FIG. 1 schematically shows a wastewater lifting station according to an embodiment of the invention during the intake of wastewater.

FIG. 1 illustrates a wastewater lifting station having the substantial component parts, which is largely identical to that wastewater station that is described in International patent document no. WO 2010/025852 A1 of the applicant. The illustrated wastewater lifting station may be fitted in a wastewater duct (not explicitly illustrated), preferably at the lowest point thereof.

The fundamental construction of the wastewater lifting station includes an intake 1 via which wastewater which is loaded with solids makes its way through an interdisposed shut-off flap 2 into a bulky-material collection container 3. The wastewater is relieved of the bulky materials and is subjected to pre-cleaning in the bulky-material collection container 3. The pre-cleaned wastewater via a discharge line 4 makes its way to a pump 5 and from there may be transferred to a fluid collection container (not illustrated) and stored, herein.

A separating screen 6 serves primarily for pre-cleaning the wastewater in the bulky-material collection container 3. The separating screen 6 subdivides the bulky-material collection container 3 into a bulky-material loaded region 3a and a bulky-material free region 3b. The overall layout here is such that the solids which are infed with the wastewater via the intake line 1 are collected in the bulky-material loaded region 3a and are retained by the separating screen 6. On account thereof, the bulky-material free region 3b to the largest extent is free of solids, and consequently pre-cleaned wastewater is conveyed with the aid of the pump 5. On account thereof, at this point a rotary pump of comparatively small constructive size having a small opening cross section and reduced output in comparison to pumps which have to simultaneously convey solids may be used.

The separating screen 6 is also complemented by a shut-off/screening installation 7, 8. The shut-off/screening installation 7, 8 in question is overall to be considered an option and is not required by default. In fact, the combined shut-off/screening installation 7, 8 as a functional unit is assembled from a shut-off flap 8 and a screen having webs 7. Like the separating screen 6, the screen of the combined shut-off/screening installation 7, 8 ensures that the solids in the wastewater which is infed via the intake line 1 are retained in the bulky-material loaded region 3a of the bulky-material collection container 3.

The screen is constructed from a plurality of webs 7. The webs 7 at least partially encircle an associated opening 9 in a connector flange or a side flange 10, respectively, of the bulky-material collection container 3, said flange being illustrated in the front view of FIG. 2. For this purpose, the individual webs 7 may be disposed so as to be mutually equidistant and so as to encircle the opening 9 in question.

The solids in the wastewater which is infed via the intake 1 with the aid of the two screens 6, 7 are retained in the bulky-material loaded region 3a of the bulky-material collection container 3. However, in principle operation at this point is also possible using only the separating screen 6 which is yet to be described in more detail hereunder. A flow baffle plate 11, which ultimately assumes the function of a bypass 11, can also be seen in the bulky-material free region 3b of the bulky-material collection container 3. The bypass 11 is presently inserted in the bulky-material free region 3b of the bulky-material collection container 3 or is disposed therein, respectively, and in the context of the exemplary embodiment as per FIG. 1 manifests itself as the flow baffle plate 11 of corresponding design.

Figure 4:
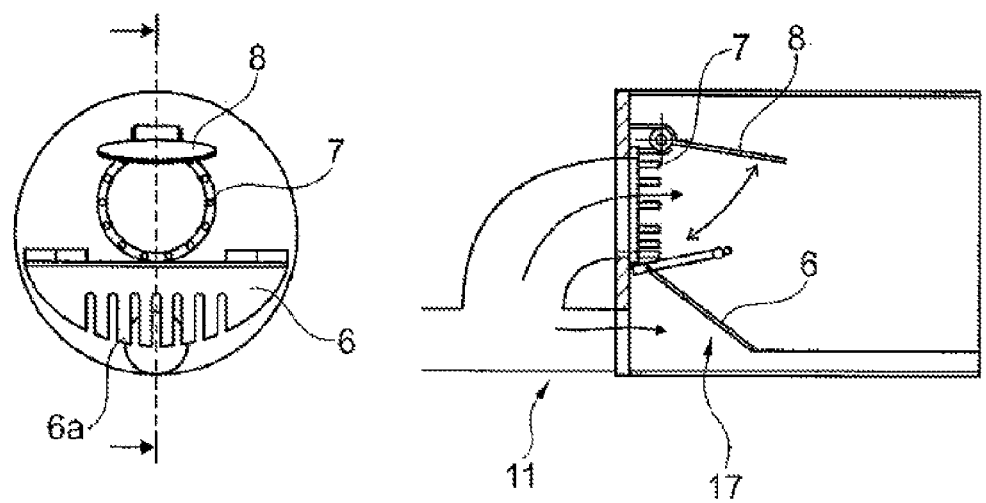
FIG. 4 shows the subject matter of FIG. 3 during a wastewater conveying procedure.

By contrast, the variant as per FIG. 4 shows a bypass 11 which is externally attached to the bulky-material collection container 3, with the functional unit 10, 6, 7, 8, 11 located at an end flange 19. Like the shut-off/screening installation 7, 8, the bypass or the flow baffle plate 11, respectively in principle may be dispensed with.

As a matter of fact according to the invention, the primary issue is for the separating screen 6 which is disposed in the interior of the bulky-material collection container 3 to retain the solids which are conjointly carried with the wastewater in the bulky-material loaded region 3a, whereas the wastewater which has been pre-cleaned in this manner passes through the separating screen 6. In the context of the invention the separating screen 6 is now pivotably connected to the already discussed flange 10 of the bulky-material collection container 3 via one or two hinges 12, respectively. The flange 10 in the exemplary embodiment is an end flange or a side flange of the bulky-material collection container 3, respectively, which is illustrated in detail in FIGS. 2 to 4. The flange 10 in question may be connected to the end flange 19 or form a functional unit therewith.

The separating screen 6 at least on the hinge-remote peripheral region 6a thereof includes a cut-out 13 which is open toward the outside, that is to say toward the peripheral region 6a. Otherwise, the separating screen 6 as per the exemplary embodiment is configured so as to be plate-like and closed. Most often, the separating screen 6 is a disk-like or circular-disk segment type metal plate having the at least one cut-out 13. A plurality of cut-outs 13 which are largely disposed so as to be centric in the separating screen 6 are typically provided. The hinge-remote peripheral region 6a of the separating screen 6 lies opposite the hinge-side region 6b, as can be readily seen in FIG. 2.

Figure 3:
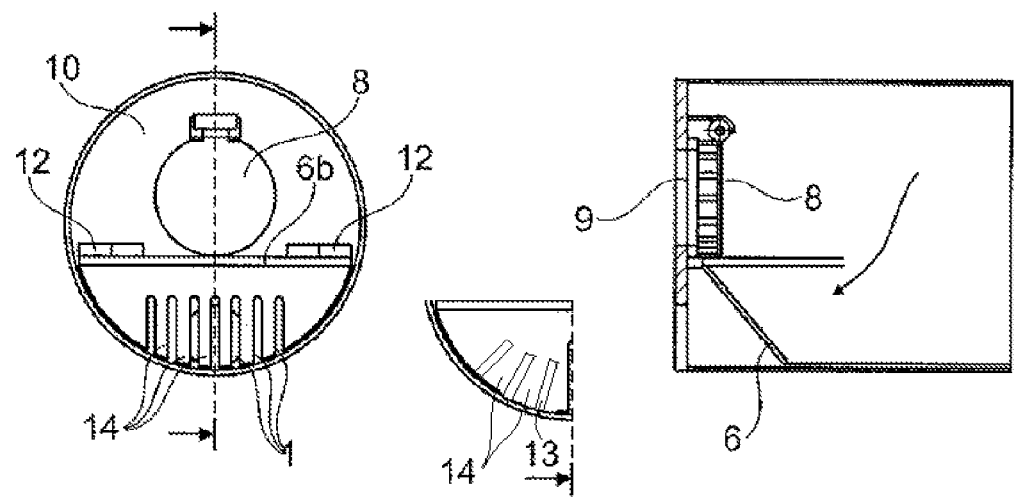
FIG. 3 shows an embodiment containing the subject matter of FIG. 1 in a detail during the intake of wastewater.

As a matter of fact, a plurality of cut-outs 13 which in each case are open toward the outside are implemented in this hinge-remote peripheral region 6a of the separating screen 6. The cut-outs 13 in question are longitudinal slots 13 which are to be found between in each case comb-type webs 14. The longitudinal slots 13 here all are configured so as to be open toward the outside, that is to say toward the hinge-remote peripheral region 6a of the separating screen 6. FIG. 3 also shows a partial view of the above-mentioned variant of radially-aligned cut-outs 13 and webs 14.

Figure 2:
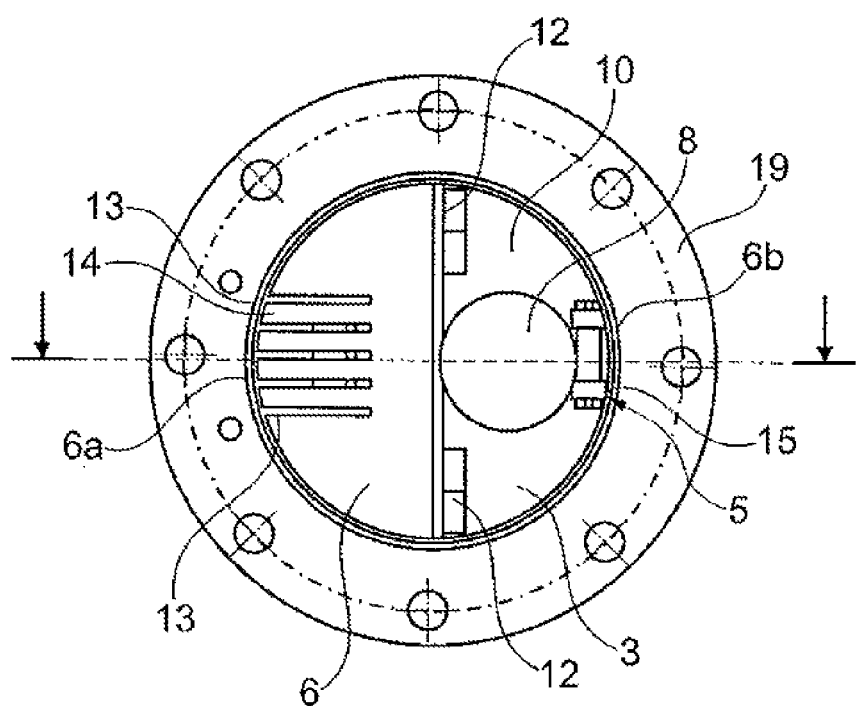
FIG. 2 shows a view from the direction X toward the flange for mounting the separating screen according to FIG. 1.

It can be seen in FIG. 2 that the comb-type webs 14 like the longitudinal slots 13 are in each case disposed so as to be mutually equidistant, that is to say identically spaced apart. In principle, the longitudinal slots 13 and the webs 14 may not only run in a mutually parallel manner, but also be mutually aligned radially.

The separating screen 6 in this embodiment is configured in the manner of a circular-disk segment or of an elliptic segment, respectively. The flange 10 is likewise a circular-disk segment. The overall layout here is such that the flange 10 and the separating screen 6 in the plan view complement one another to form a circular disk which as a separating wall is inserted in the bulky-material collection container 3 which is configured so as to be correspondingly hollow-cylindrical. The shut-off/screening installation 7, 8 is also connected to the flange 10, specifically so as to the pivotable, like the separating screen 6. To this end, a further hinge 12 is provided in this context (cf. FIG. 2).

It can be seen in FIGS. 1, 2, 3, and 4 that the separating screen 6 is connected to the flange 10 at an inclination angle α, or that the inclination angle α in relation to the inner wall or to a sealing region 16 of the bulky-material collection container 3 is observed, respectively. During intake of the wastewater so as to correspond to the illustration as per FIGS. 1 and 3 the inclination angle α is typically less than 90°. Moreover, inclination angles α of more than 20° are most often observed. An inclination angle α of less than 70° is preferable. Inclination angles α in the range from approx. 30° to 55° are very particularly preferred.

However, should the wastewater lifting procedure corresponding to the illustration as per FIG. 4 arise and the separating screen 6 be flushed so as to be relieved of the solids adhering thereto, a reduction of the inclination angle α will be observed. In fact, on account of the described wastewater lifting procedure, the inclination angle α is reduced by approx. 5° to 10°. During intake of the wastewater as per FIGS. 1 and 3, the inclination angle α may lie in the range of approximately 45°. The wastewater lifting procedure as per FIG. 4 in the exemplary case corresponds to an inclination angle α of about 40°. Of course, all this data is to be understood to be only exemplary and in no way limiting.

As a result of the circular-disk segment type configuration of the separating screen 6, the hinge-remote peripheral region 6a as per the illustration in FIG. 2 defines an arc, the radius of which is adapted to the internal radius of the hollow-cylindrical bulky-material collection container 3. On account thereof, the separating screen 6 during intake of the wastewater as per the illustrations in FIGS. 1 and 3 bears on the correspondingly curved sealing region 16 on the inner wall of the bulky-material collection container 3. Consequently, during intake of the wastewater and when the separating screen 6 bears on the sealing region 16 in question, only solids which in terms of their intersection or cross section, respectively, "fit" through the longitudinal slots 13 can ultimately pass through the separating screen 6.

Since wastewater nowadays is often loaded with fibers, there is the risk that such fibers during intake of the wastewater clog the individual longitudinal slots 13 and/or partially pass through the longitudinal slots 13. To date is has been practically impossible for such solids to be removed (any more) during a subsequent wastewater lifting procedure and the associated flushing out of the separating screen 6. According to the invention, this is possible as soon as a lifting procedure of the wastewater and the associated flushing out of the separating screen 6 takes place. This is illustrated in FIG. 4.

The pump 5 in this procedure ensures that a reversal of direction of the wastewater stream takes place. While in the context of FIG. 1 the wastewater via the intake 1 has streamed through the separating screen 6 and reaches the bulky-material free region 3b as well as the connection line 4 and finally the pump 5, now a reversal of the flow path such as is highlighted by the arrows for the flow of the wastewater which are indicated in FIG. 4 takes place. As soon as the pump 5 ensures a lifting procedure of the wastewater and generates the flow illustrated in FIG. 4, the separating screen 6 is upwardly pivoted and the inclination angle α is reduced, and as a result thereof the hinge-remote peripheral region 6a moves away from the sealing region 16. A flow passage 17 is thus observed at this point.

At the same time, during this procedure any potential fibers which may be located in the longitudinal slots 13 are stripped away from the separating screen 6, because the longitudinal slots 13 are in each case open toward the hinge-remote peripheral region 6a in question of the separating screen 6, and consequently in the direction of the stream during flushing, which is indicated by an arrow. Moreover, any potential further solids which have been retained by the separating screen 6 are flushed away and removed from the separating screen 6 during this procedure. This applies to the webs 7 of the combined shut-off/screening installation 7, 8 in a comparable way. Due to the pressure ratios which are correspondingly set and generated with the aid of the pump 5, a flow through the combined shut-off/screening installation 7, 8, which is indicated in FIG. 4, arises, so that the shut-off flap 8 is opened as illustrated therein. As a result, any potential solids adhering to the webs 7 are likewise stripped away and via a pressure line 18 conveyed to a remote wastewater treatment plant.

During this procedure the shut-off flap 2 which is located in the intake line 1 is closed according to the illustration as per FIG. 1, so that the lifted wastewater together with the solids is collectively conveyed in the pressure line 18. In principle, the shut-off flap 2 and the shut-off flap 8 may also be integrated. Then the shut-off flap 8 of the combined shut-off/screening installation 7, 8 also ensures closure of the intake line 1. This applies in any case to the pumping operation or the wastewater lifting procedure, respectively, while during intake of wastewater the intake line 1 is opened and the shut-off flap 8 is closed and covers the opening 9.

The bypass or the flow baffle plate 11 provided at this point, respectively, may further support the described flushing procedure to that extent that during each wastewater lifting procedure or during the pumping operation, respectively, in each case both the separating screen 6 as well as the shut-off flap 8 of the combined shut-off/screening installation 7, 8 are opened. This shown in FIG. 4.

The flange 10, the separating screen 6, the combined shut-off/screening installation 7, 8, and the bypass 11 cooperate with the full or partial housing of the bulky-material collection container 3 and form a functional unit 10, 6, 7, 8, 11. This functional unit 10, 6, 7, 8, 11 may be inserted into the bulky-material collection container 3, or by way of an additional terminal flange be formed as a portion of the bulky-material collection container 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A wastewater lifting station, comprising:
   at least one bulky-material collection container; and
   at least one separating screen arranged in an interior of the at least one bulky-material collection container, the at least one separating screen being configured to guide wastewater therethrough while separating bulky materials from the wastewater,
   wherein the at least one separating screen
      subdivides the at least one bulky-material collection container into a bulky-material loaded region and a bulky-material free region,
      is pivotable via a hinge to a flange of the bulky-material collection container,
      at least in a peripheral region remote from the hinge—has at least one cut-out which is open toward an outside edge adjacent to a side wall of the at least one bulky-material collection container,
      the at least one separating screen bears obliquely on a sealing region of the bulky-material collection container, and
      the at least one separating screen is arranged in the bulky material collection container such that in a reverse flow cleaning operation, the at least one separating screen is raised by the reverse flow from the sealing region to form a flow passage through a gap between the raised at least one separating screen and the sealing region of the bulky-material collection container.

2. The wastewater lifting station as claimed in claim 1, wherein the at least one cut-out in the at least one separating screen in the hinge-remote peripheral region is a plurality of longitudinal slots between webs.

3. The wastewater lifting station as claimed in claim 2, wherein the webs and the plurality of longitudinal slots are substantially mutually equidistant.

4. The wastewater lifting station as claimed in claim 3, wherein the plurality of longitudinal slots and the webs are aligned substantially parallel.

5. The wastewater lifting station as claimed in claim 3, wherein the plurality of longitudinal slots and the webs are aligned substantially radially.

6. The wastewater lifting station as claimed in claim 1, wherein the at least one separating screen is configured as a circular-disk segment.

7. The wastewater lifting station as claimed in claim 1, further comprising:
   a shut-off installation is connected to the flange.

8. The wastewater lifting station as claimed in claim 7, wherein in an installed state in the bulky-material collection container the at least one separating screen is disposed at an inclination angle relative to the flange.

9. The wastewater lifting station as claimed in claim 8, further comprising:
   a bypass arranged downstream of the at least one separating screen at least one of in and in communication with the bulky-material free region of the bulky-material collection container.

10. The wastewater lifting station as claimed in claim 9, wherein the flange the at least one separating screen, the shut-off installation and the bypass form a functional unit configured to at least one of be inserted into and form a portion of the bulky-material collection container.

11. The wastewater lifting station as claimed in claim 1, wherein in an installed state in the bulky-material collection container the at least one separating screen is disposed at an inclination angle relative to the flange.

12. The wastewater lifting station as claimed in claim 1, further comprising:
   a bypass arranged downstream of the at least one separating screen at least one of in and in communication with the bulky-material free region of the bulky-material collection container.

13. The wastewater lifting station as claimed in claim 12, wherein the flange the at least one separating screen, and the bypass form a functional unit configured to at least one of be inserted into and form a portion of the bulky-material collection container.

* * * * *